US006945769B2

United States Patent
Deaville et al.

(10) Patent No.: US 6,945,769 B2
(45) Date of Patent: Sep. 20, 2005

(54) VALVE FOR AN INJECTION MOLDING MANIFOLD

(75) Inventors: Todd Deaville, Brampton (CA); Steven J. Mori, Aurora (CA); Rudolf Allan Schrempf, Brampton (CA)

(73) Assignee: Decoma International Inc., Concord (CA)

( * ) Notice: Subject to any disclaimer, the term of this patent is extended or adjusted under 35 U.S.C. 154(b) by 186 days.

(21) Appl. No.: 10/438,603

(22) Filed: May 15, 2003

(65) Prior Publication Data

US 2004/0018268 A1 Jan. 29, 2004

Related U.S. Application Data

(60) Provisional application No. 60/380,889, filed on May 16, 2002.

(51) Int. Cl.$^7$ ................................................ B29C 45/23
(52) U.S. Cl. ........................ 425/564; 425/566; 425/572
(58) Field of Search ................................ 425/564, 566, 425/572

(56) References Cited

U.S. PATENT DOCUMENTS

| | | |
|---|---|---|
| 3,354,507 A | 11/1967 | Orrevad |
| 3,500,501 A | 3/1970 | Johnasson |
| 3,589,163 A | 6/1971 | Byrne |
| 3,818,313 A | 6/1974 | Rosenstein et al. |
| 3,935,972 A | 2/1976 | Tsunemoto et al. |
| 4,077,760 A | 3/1978 | Sauer |
| 4,099,904 A | 7/1978 | Dawson |
| 4,368,028 A | 1/1983 | Grish et al. |
| 4,542,054 A | 9/1985 | Fillmann |
| 4,715,802 A | 12/1987 | Arai |
| 4,740,150 A | 4/1988 | Sayer |
| 5,090,890 A * | 2/1992 | Morita ........................ 425/564 |
| 5,225,217 A | 7/1993 | Wisen et al. |
| 5,762,855 A | 6/1998 | Betters et al. |
| 6,186,769 B1 | 2/2001 | Hawley |
| 6,355,197 B1 | 3/2002 | Lausenhammer et al. |

FOREIGN PATENT DOCUMENTS

WO    WO 01/03902 A1    1/2001

* cited by examiner

*Primary Examiner*—Tim Heitbrink
(74) *Attorney, Agent, or Firm*—Clark Hill PLC

(57) ABSTRACT

A valve gate is provided for an injection molding manifold having at least one drop defining at least one channel for transporting a flow of plasticized melt therethrough. The valve gate has a pin mounted in the manifold to extend across the channel in a sliding relation. The pin has a transversely extending aperture that aligns with the channel opening the flow. Reciprocating movement of the pin in a direction transverse to the flow of the plasticized melt opens and closes flow thereof.

7 Claims, 2 Drawing Sheets

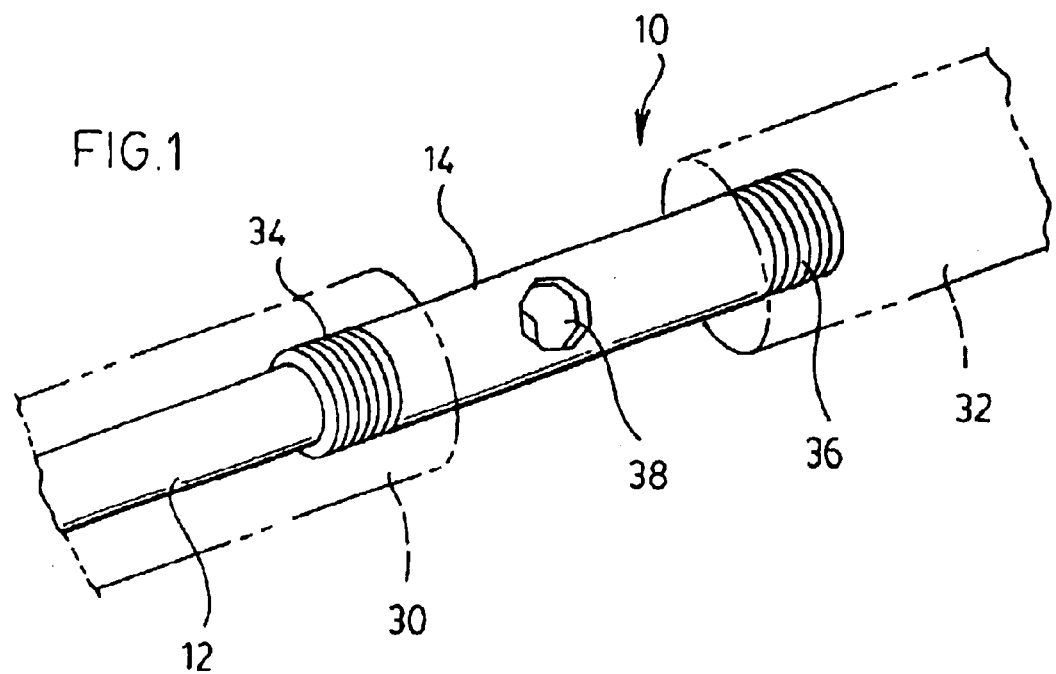
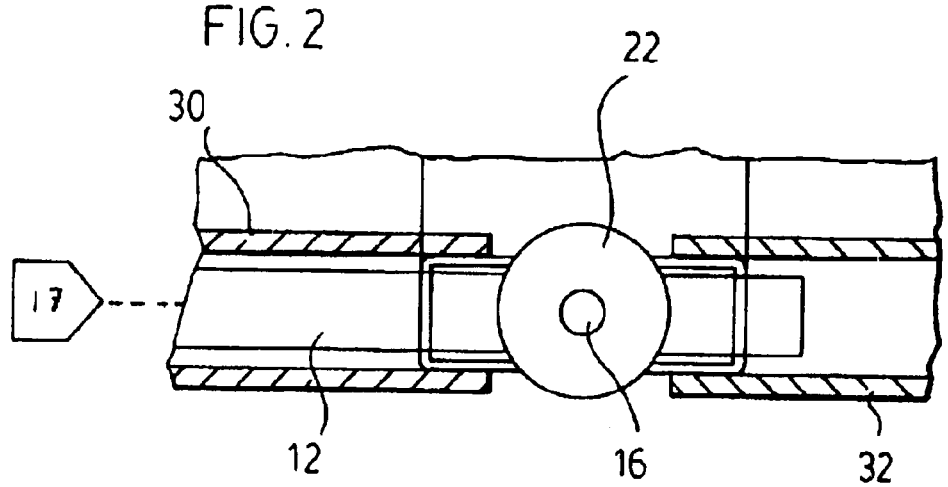

VALVE FOR AN INJECTION MOLDING MANIFOLD

This application claims priority to and all the benefits of U.S. Provisional Patent Application No. 60/380,889, filed on May 16, 2002.

FIELD OF INVENTION

This invention relates to a valve pin for an injection molding apparatus. In particular, this invention relates to a valve pin or gate for enabling and shutting a flow of plasticized melt in an injection molding apparatus, wherein the movement of the pin is transverse to the direction of flow of the plasticized melt.

BACKGROUND OF INVENTION

An injection molding apparatus will have a manifold for delivering the plasticized melt from the injection unit to the mold cavity. The manifold will have a header and may have a number of drops, each having a valve gate for sequentially injecting and filling the mold cavity. As shown in FIG. 4, each valve gate 72 has a pin 74 that moves in the direction of the flow of plasticized melt to remotely open and close the valve and thus control the flow of the plasticized melt. U.S. Pat. No. 5,762,855 describes in detail an apparatus for injection molding utilizing sequential valve gating.

The pin arrangement of the prior art operates effectively for plasticized melt that do not include glass fibres. However, if the plasticized melt includes glass fibres, the pin location in the manifold drop creates an annular flow channel, reducing the effective flow area and increasing material pressure drop and shear, leading to glass fibre breakage. In addition, the tip of the pin creates additional shear on the material leading to further glass fibre breakage. Further, the operation of the pin in opening and closing the valve gate has a tendency to break the glass fibres and thereby reduce the effectiveness of the glass fibres as reinforcement of the finished molded part.

Thus, there is a recognized need to provide an apparatus for delivering plasticized melt incorporating long glass fibres to a mold cavity without seriously affecting material flow and damaging or breaking the fibres.

SUMMARY OF THE INVENTION

The disadvantages of the prior art are overcome by providing a valve gate having a control pin that operates transversely to the flow of the plasticized material for minimizing damage to the glass fibres incorporated into the plasticized melt.

According to one aspect of the invention, there is provided a valve gate for an injection molding manifold having at least one drop defining at least one channel for transporting a flow of plasticized melt therethrough. The valve gate has a pin mounted in the manifold to extend across the channel in a sliding relation. The pin has a transversely extending aperture that aligns with the channel opening the flow. Reciprocating movement of the pin in a direction transverse to the flow of the plasticized melt opens and closes flow thereof.

DESCRIPTION OF THE DRAWINGS

In drawings which illustrate an embodiment of the present invention,

FIG. 1 is a perspective schematic view of the valve of the present invention;

FIG. 2 is a top plan view of the valve of the present invention;

DESCRIPTION OF THE INVENTION

Figure 3:
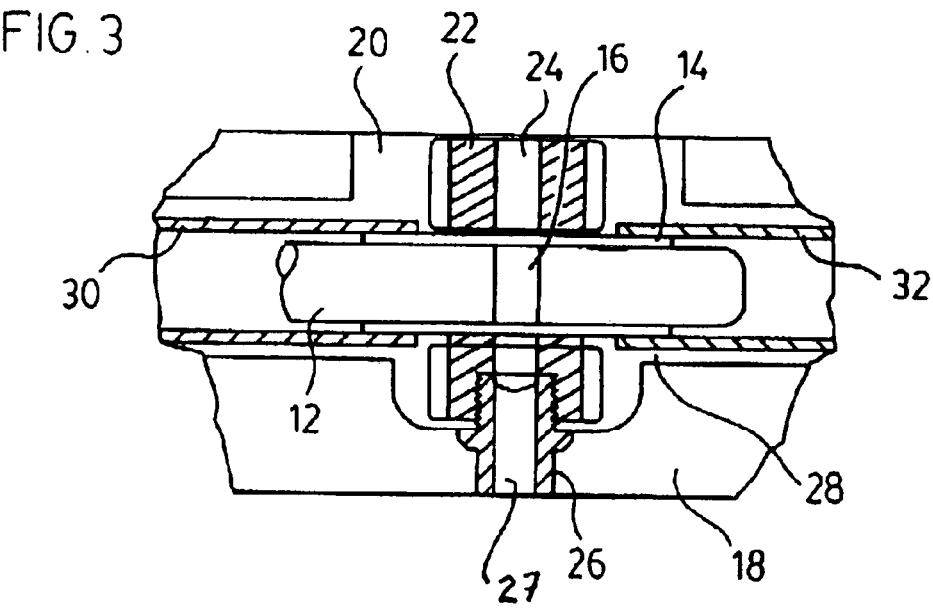
FIG. 3 is a side elevational view of the valve of FIG. 2.
Figure 4:
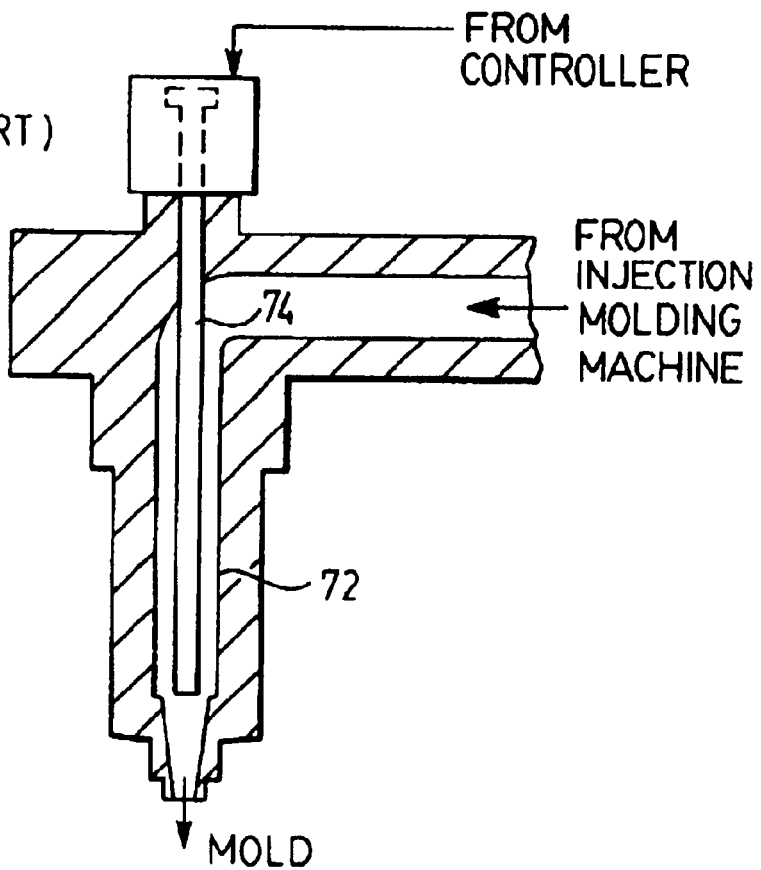
FIG. 4 is cross-sectional view of a valve gate of the prior art.

Referring to FIG. 1, a schematic of the control pin assembly 10 of the present invention is illustrated. The control pin 10 generally comprises a shut-off pin 12 slidably mounted within a first tube 14. Shut-off pin 12 is similar to a conventional pin utilized in conventional valve gates, except that shut-off pin 12 has a transverse aperture 16 and thus will be larger in diameter to allow for the aperture. A conventional driver 17 operatively mounts to an end opposite the aperture 16 for effecting reciprocating movement to open and close the valve.

Referring to FIGS. 2 and 3, the manifold section 18 is illustrated. Manifold section 18 has a first passageway 20, in which a plug 22 is inserted. Plug 22 has an internal channel 24, through which plasticized melt flows. A tip 26 threadably engages the plug 22 to mount the plug 22 within the internal channel 24. Preferably, tip 26 has an internal channel 27 that completes a communication passageway with the mold cavity. Plug 22 has a transversely extending aperture that slidingly and sealingly receives shut-off pin 12.

Manifold section 18 has a transverse passageway 28 that communicates with first passageway 20. Two protective sleeves 30, 32 are mounted in the passageway 28. Sleeves 30 and 32 each has an internal thread for engaging with threads 34, 36 of first tube 14. First tube 14 has a through hole 38 that is aligned with the first passageway 20 when engaging the two protective sleeves 30, 32.

Tube 14 is preferably shrink fitted onto the end of shut-off pin 12 to provide a seal preventing plasticized melt for leaking therebetween.

In operation, shut-off pin 12 is operative connected with a driver 17 for moving the pin 12 in a reciprocating manner. In an open condition, aperture 16 aligns with the internal channel 24 enabling flow of plasticized melt therethrough. In a closed condition, pin 12 blocks the internal channel 24, preventing or discontinuing flow therethrough. Movement of the pin 12 is substantially transverse to the flow direction of the plasticized melt.

The operation of the control pin assembly 10 will break glass fibres only when the shut-off pin is being moved between the open and closed conditions. In comparison, the prior art valve gates will always occupy the flow area of the drop and will always have some effect on the breakage of the glass fibres. Thus, the control pin assembly 10 of the present invention minimizes the effects of the shut-off pin on material flow and resulting fibre length.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A valve gate for an injection molding manifold having at least one drop defining at least one channel for transporting a flow of plasticized melt therethrough, said valve gate comprising:

a pin mounted in said manifold to extend across said channel in a sliding relation, said pin having a transversely extending aperture that aligns with said channel, whereby reciprocating movement of said pin in a direction transverse to the flow of said plasticized melt, opens and closes said flows;

a plug having an internal channel through which said plasticized melt flows, said plug mountable in said at least one channel and having a transversely extending aperture, and said pin extends through said transversely extending aperture of said plug; and a tube extending transversely through said transversely extending aperture of said plug, said pin slidably engaging said tube.

2. A valve gate as claimed in claim 1 wherein said tube is shrink fitted on said pin.

3. A valve gate as claimed in claim 2 further comprising a pair of protective sleeves mounted on opposite ends of said tube.

4. A valve gate as claimed in claim 3 wherein said protective sleeves are mounted within a transverse passageway in said manifold to support said pin.

5. A valve gate as claimed in claim 4 wherein said plug has a tip adapted to engage said manifold, mounting said plug within said at least one channel.

6. A valve gate as claimed in claim 5 wherein said tip has an internal channel that communicates with said internal channel of said plug.

7. A manifold for an injection mold, said manifold having at least one drop defining at least one channel for transportin a flow of plasticized melt therethrough and a valve gate in each of said at least one channel, at least one of said valve gates in at least one of said channels comprising:

a pin moveably mounted in said manifold to extend across said channel in a sliding relation, said pin having a transversely extending aperture that aligns with said channel, whereby reciprocating movement of said pin in a direction transverse to the flow of said plasticized melt, opens and closes said flow;

a plug having an internal channel through which said plasticized melt flows, said plug mountable in said at least one channel and having a transversely extending aperture, and said pin extends through said transversely extending aperture of said plug; and a tube extending transversely through said transversely extending aperture of said plug, said pin slidably engaging said tube.

* * * * *